(12) United States Patent
Kobayashi et al.

(10) Patent No.: US 6,220,210 B1
(45) Date of Patent: Apr. 24, 2001

(54) SOLENOID VALVE DRIVING DEVICE

(75) Inventors: Hiroshi Kobayashi; Minoru Torii; Minoru Nakamura, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/531,500

(22) Filed: Mar. 21, 2000

(30) Foreign Application Priority Data

Mar. 29, 1999 (JP) ................................................. 11-085350

(51) Int. Cl.⁷ ........................................................ F01L 9/04
(52) U.S. Cl. .................................. 123/90.11; 251/129.01; 251/129.15
(58) Field of Search ..................... 123/90.11; 251/129.01, 251/129.05, 129.1, 129.15, 129.16; 335/256

(56) References Cited

U.S. PATENT DOCUMENTS 4,779,582 * 10/1988 Lequesne ........................... 123/90.11
5,669,341 * 9/1997 Ushirono et al. ................. 123/90.11

FOREIGN PATENT DOCUMENTS 9-256826    9/1997 (JP).

* cited by examiner

*Primary Examiner*—Weilun Lo
(74) *Attorney, Agent, or Firm*—Arent Fox Kintner Plotkin & Kahn, PLLC

(57) ABSTRACT

Disclosed herein is a solenoid valve driving device having at least two solenoid valves arranged in adjacent relationship. Magnetic fluxes generated in adjacent solenoids of the solenoid valves upon energization thereof are opposite in direction to each other. Accordingly, when the adjacent solenoids are simultaneously energized, a common magnetic circuit between these solenoids is generated to result in an increase in magnetic flux, thereby increasing a magnetic attraction force of each solenoid. Thus, the solenoid valve driving device can sufficiently ensure the magnetic attraction force of each solenoid and can achieve size reduction and power saving.

4 Claims, 4 Drawing Sheets

SOLENOID VALVE DRIVING DEVICE

BACKGROUND OF THE INVENTION

The present invention relates to a driving device for a solenoid valve having a valve element to be driven by an electromagnetic force, and more particularly to such a solenoid valve driving device for two adjacent solenoid valves.

It is known that an intake valve and an exhaust valve of an internal combustion engine are configured by solenoid valves each having a valve element to be driven by an electromagnetic force. To minimize the power required to drive such an electromagnetically driven intake valve or exhaust valve, increasing the sectional area of a magnetic circuit in a driving device for driving the solenoid valve is effective. However, such an increase in the sectional area causes an increase in size of the driving device. For example, in the case that two intake valves and two exhaust valves are provided in one cylinder, a mounting space for the driving device is lacking. Japanese Patent Laid-open No. 9-256826 has proposed a solution for this problem such that the contact surfaces of two adjacent driving devices are made flat to thereby reduce the distance between the two adjacent driving devices, thus allowing the driving devices to be mounted at an upper portion of an internal combustion engine.

In the case of operating two adjacent intake valves, for example, the two adjacent intake valves are normally operated at the same timing, so that it is assumed that magnetic fluxes generated in the two adjacent driving devices may interfere with each other. However, this point is not considered at all in the above publication. Thus, there is still room for improvement in the device according to the above publication from the viewpoints of further reduction in size of each driving device and further reduction in power consumption.

SUMMARY OF THE INVENTION

It is accordingly an object of the present invention to provide a solenoid valve driving device which can sufficiently ensure magnetic attraction forces of solenoids of adjacent solenoid valves and can achieve size reduction and power saving.

According to the present invention, there is provided In a solenoid valve driving device having at least two solenoid valves arranged In adjacent relationship, the improvement wherein the directions of magnetic fluxes generated in solenoids of two adjacent ones of said at least two solenoid valves upon energization thereof are opposite to each other.

With this configuration, the directions of magnetic fluxes generated in the solenoids of the two adjacent solenoid valves upon energization thereof are opposite to each other. Accordingly, the two solenoids have a common magnetic circuit to result in an increase in magnetic flux. As a result, when the two solenoids are energized at substantially the same timing, a magnetic attraction force of each solenoid can be increased. Accordingly, the sectional area of a magnetic circuit for obtaining a required magnetic attraction force can be reduced to thereby achieve a reduction in size of the device, and the power for obtaining a required magnetic attraction force can be reduced to thereby achieve power saving.

Preferably, each of said at least two solenoid valves is an intake valve or an exhaust valve of an internal combustion engine, and is provided on the upper side of a combustion chamber of said internal combustion engine.

In the case that at least two intake valves are provided in one cylinder of an internal combustion engine, the at least two intake valves are opened or closed always at substantially the same timing. Similarly, in the case that at least two exhaust valves are provided in one cylinder of an internal combustion engine, the at least two exhaust valves are opened or closed always at substantially the same timing. Accordingly, by applying each solenoid valve to an intake valve or an exhaust valve of an internal combustion engine, the abovementioned effects of the present invention become more remarkable. Furthermore, this configuration is very effective in locating intake valves and exhaust valves in a limited space at an upper portion of an internal combustion engine.

Preferably, the solenoids of the adjacent solenoid valves are configured so as to partially share magnetic circuits, that is, the outer yokes of the adjacent two solenoids are in contact with each other through a flat contact surface.

Other objects and features of the invention will be more fully understood from the following detailed description and appended claims when taken with the accompanying drawings.

DETAILED DESCRIPTION OF THE PREFERRED EMBODIMENTS

A preferred embodiment of the present invention will now be described with reference to the drawings.

Figure 1:
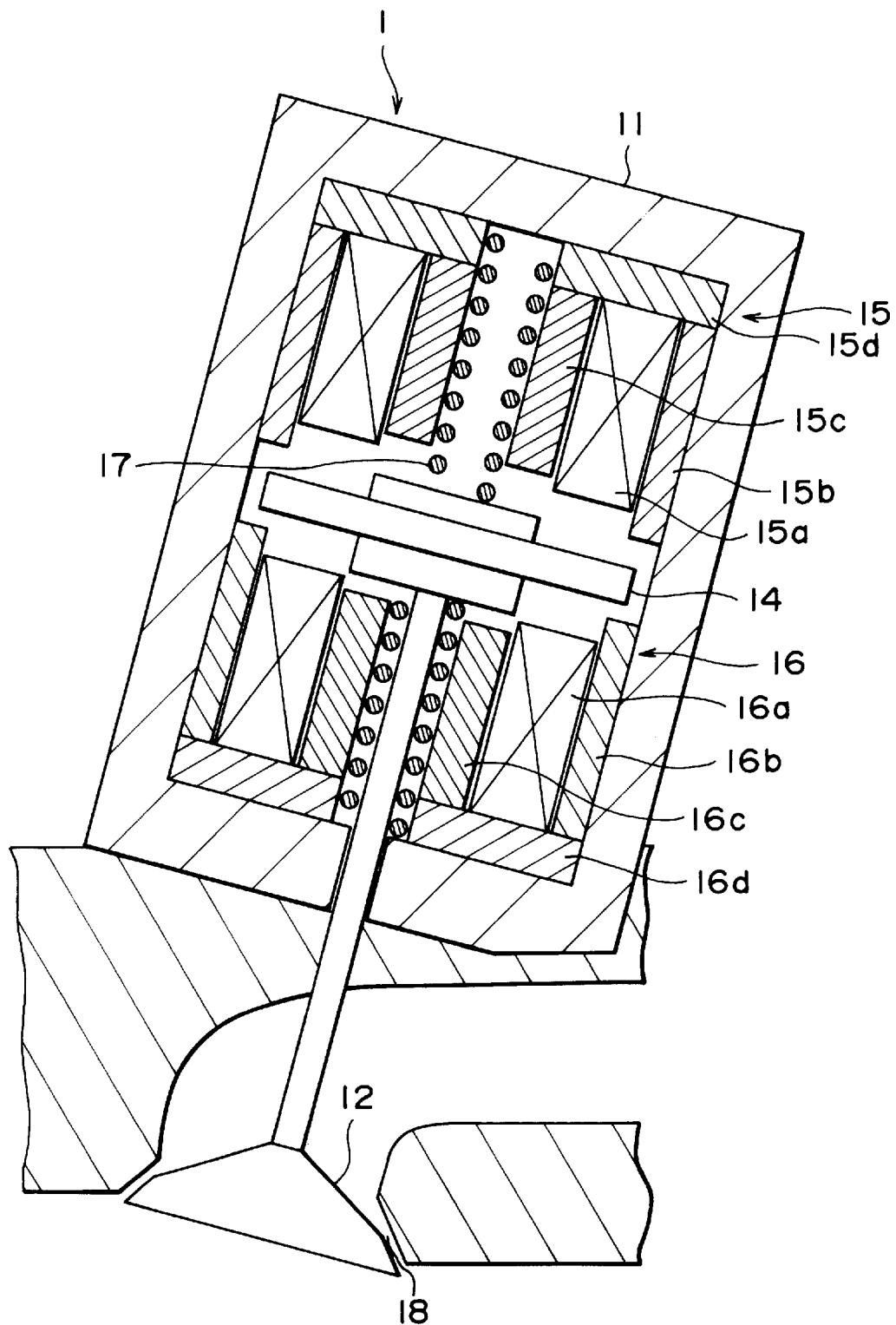
FIG. 1 is a vertical sectional view showing the structure of a solenoid valve driving device according to a preferred embodiment of the present invention applied to an Intake valve In an Internal combustion engine.
Figure 2:
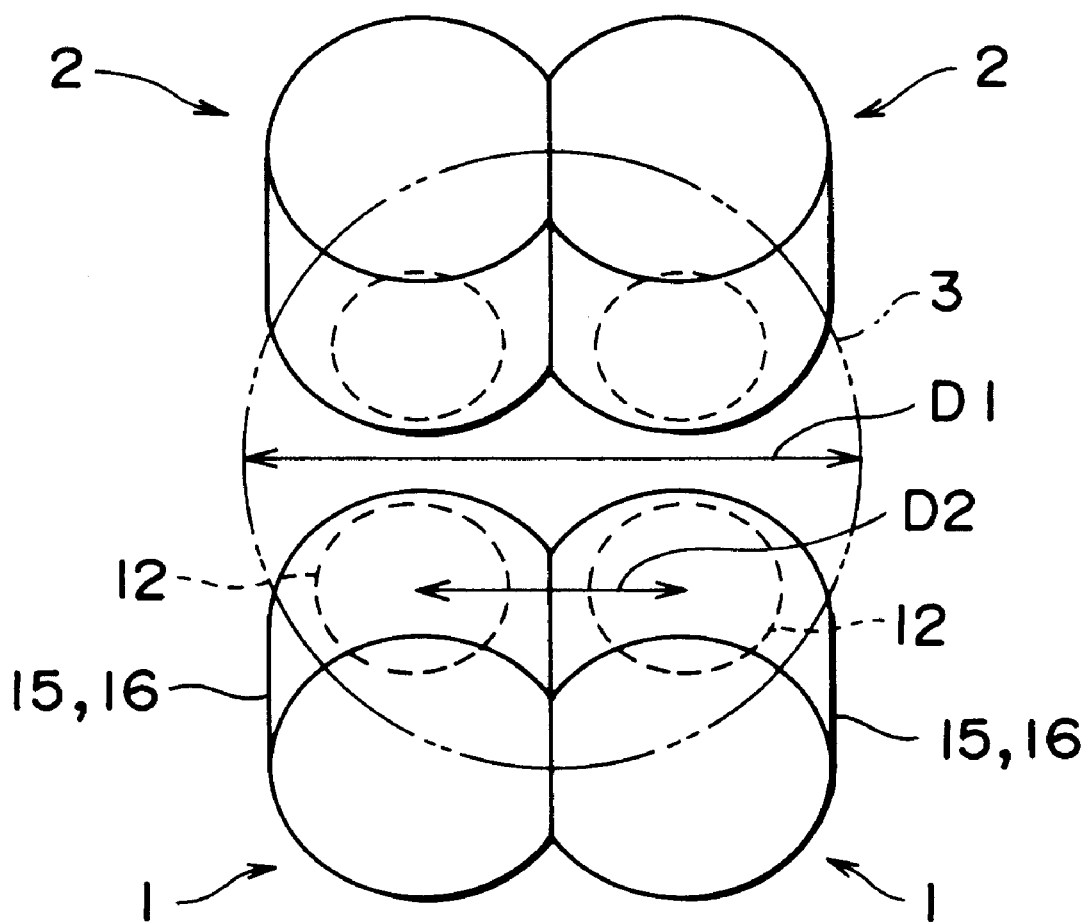
FIG. 2 is a schematic plan view for illustrating the arrangement of intake valves and exhaust valves in the internal combustion engine shown in FIG. 1.

FIG. 1 is a vertical sectional view showing the structure of a solenoid valve driving device according to a preferred embodiment of the present invention applied to an intake valve in an internal combustion engine (which will be hereinafter referred to as "engine") 10. As shown in FIG. 2, two intake valves 1 and two exhaust valves 2 are provided in one cylinder 3 of the engine 10 in this preferred embodiment. While the configuration of each intake valve 1 is shown in FIG. 1, the configuration of each exhaust valve 2 is similar to that of each intake valve 1. Each intake valve 1 is composed of a valve element 12 to which an armature 14 is fixed, and an actuator 11 for driving the valve element 12. Each intake valve 1 is mounted on the upper side of a combustion chamber of the engine 10, so as to open and close an intake port 18 formed at an upper portion of the combustion chamber.

Referring to FIG. 2, reference symbol D1 denotes an inner diameter or bore of the cylinder 3, and reference symbol D2 denotes a distance between the two intake valves 1, or a valve pitch. The bore D1 and the valve pitch D2 are determined by the specifications of the engine 10, so that the actuator 11 of each intake valve 1 is required to have a size meeting limitations on the bore D1 and the valve pitch D2. In this preferred embodiment, the actuators 11 of the two intake valves 1 adjacent to each other have increased diameters, and a common magnetic circuit is formed at a contact portion between the adjacent intake valves 1. Similarly, the actuators of the two exhaust valves 2 adjacent to each other have increased diameters, and a common magnetic circuit is formed at a contact portion between the adjacent exhaust valves 2. With this structure, power consumption can be reduced.

As shown in FIG. 1, the actuator 11 of each intake valve 1 is composed mainly of two solenoids (electromagnets) vertically opposed to each other, i.e., a valve closing solenoid 15 for magnetically biasing the valve element 12 in its valve closing direction and a valve opening solenoid 16 for magnetically biasing the valve element 12 in its valve opening direction, and a pair of springs 17 provided in the valve closing solenoid 15 and the valve opening solenoid 16 so as to support the armature 14. The valve opening solenoid 15 is composed of a coil 15a, a cylindrical outer yoke 15b, a cylindrical inner yoke 15c, and an annular horizontal yoke 15d. Similarly, the valve closing solenoid 16 is composed of a coil 16a, a cylindrical outer yoke 16b, a cylindrical inner yoke 16c, and a annular horizontal yoke 16d. In the valve closing solenoid 15, the outer yoke 15b and the inner yoke 15c are in contact with the horizontal yoke 15d, and when the armature 14 is magnetically attracted by the valve closing solenoid 15, magnetic circuits are formed by these yokes 15b, 15c, and 15d and the armature 14. Similarly, in the valve opening solenoid 16, the outer yoke 16b and the inner yoke 16c are in contact with the horizontal yoke 16d, and when the armature 14 is magnetically attracted by the valve opening solenoid 16, magnetic circuits are formed by these yokes 16b, 16c, and 16d and the armature 14.

The springs 17 normally support the armature 14 in its neutral position (an intermediate position between the valve closing solenoid 15 and the valve opening solenoid 16 as shown in FIG. 1). In this neutral position, the springs 17 apply no biasing forces to the valve element 12. When the armature 14 is in a position higher than the neutral position, the springs 17 apply biasing forces to the valve element 12 in its valve opening direction, whereas when the armature 14 is in a position lower than the neutral position, the springs 17 apply biasing forces to the valve element 12 In its valve closing direction.

The coils 15a and 16a of each actuator 11 are connected to an electronic control unit (not shown), and they are driven by drive signals supplied from the electronic control unit.

By energizing the valve closing solenoid 15 or the valve opening solenoid 16, the valve element 12 is moved between a fully closed position where the intake port 18 is closed by the valve element 12 and a fully open position where the lift quantity of the valve element 12 is maximum, thereby opening and closing the intake valve 1. When the solenoids 15 and 16 are in their deenergized condition, the valve element 12 is maintained at an intermediate position between the fully closed position and the fully open position.

Figure 3A:
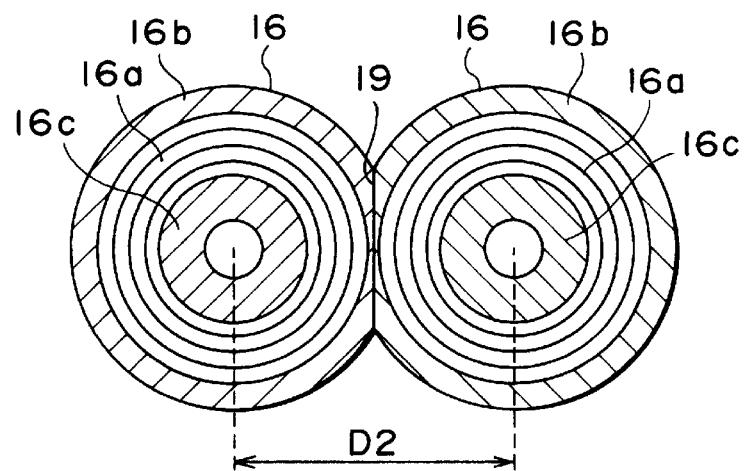
FIG. 3A is a horizontal sectional view of two adjacent solenoids shown in FIG. 1.
Figure 3B:
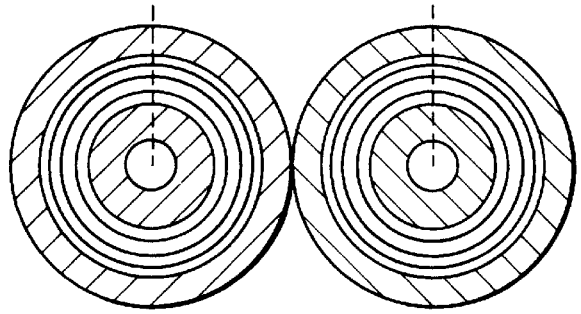
FIG. 3B is a view similar to FIG. 3A, showing a comparison.

As shown in FIG. 3A, the cross section of each valve opening solenoid 16 is substantially circular and a flat contact surface 19 is formed at a contact portion between the adjacent solenoids 16, so that the horizontal size of the outer yoke 16b of each solenoid 16 is reduced. FIG. 3B is a similar view for showing a comparison wherein the valve pitch D2 is the same as that shown in FIG. 3A and the adjacent solenoids are arranged so that the outer circumferential surfaces of the outer yokes are in point contact as viewed in cross section, i.e., the flat contact surface 19 is not formed. In this preferred embodiment, the sectional areas of the outer yoke 16b and the inner yoke 16c forming magnetic circuits are increased to reduce the power consumption of each solenoid 16, and each of the adjacent outer yokes 16b is partially cut to form the flat contact surface 19, so as to maintain the valve pitch D2 unchanged, thereby making contact of the two outer yokes 16b through the flat contact surface 19 without an increase in the valve pitch D2. Accordingly, a common magnetic circuit for the adjacent two solenoids 16 is formed in the vicinity of the flat contact surface 19 formed between the adjacent outer yokes 16b, that is, the adjacent two solenoids 16 can form a common magnetic circuit through the flat contact surface 19.

Figure 4A:
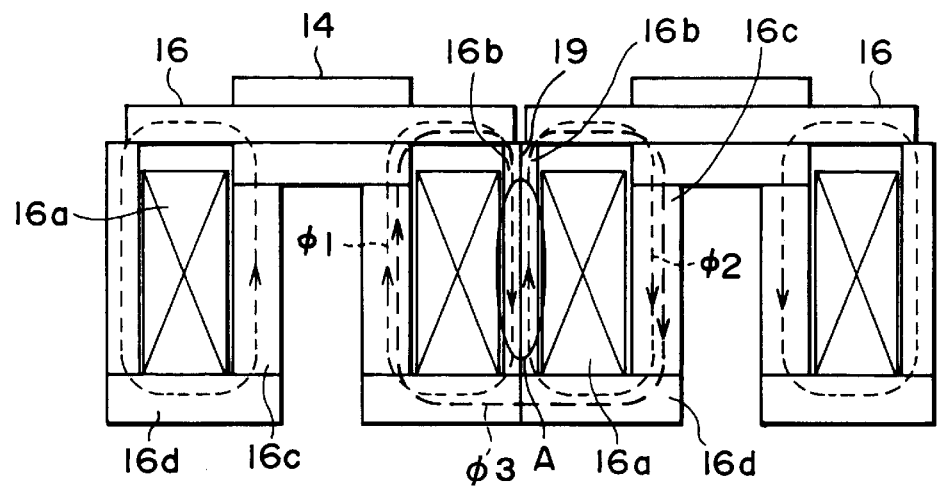
FIG. 4A is a vertical sectional view of the two adjacent solenoids in the preferred embodiment of the present invention, for illustrating an energization method for the solenoids.

The coils 16a of the adjacent two valve opening solenoids 16 are energized so that magnetic fields generated by the adjacent two solenoids 16 are opposite in direction. That is, as shown in FIG. 4A, the coils 16a of the adjacent two solenoids 16 are energized so that a magnetic flux $\phi 1$ generated by the yokes 16b, 16c, and 16d and the armature 14 of the solenoid 16 on the left side as viewed in FIG. 4A is opposite in direction to a magnetic flux $\phi 2$ generated by the yokes 16b, 16c, and 16d and the armature 14 of the solenoid 16 on the right side as viewed in FIG. 4A. Accordingly, when the adjacent two solenoids 16 are simultaneously energized, a common magnetic circuit is formed in the vicinity of the flat contact surface 19 as shown by a heavy broken line ($\phi 3$) in FIG. 4A. In other words, another magnetic flux $\phi 3$ is generated in a region other than a region A shown in FIG. 4A, so that the total magnetic flux can be increased.

Figure 4B:
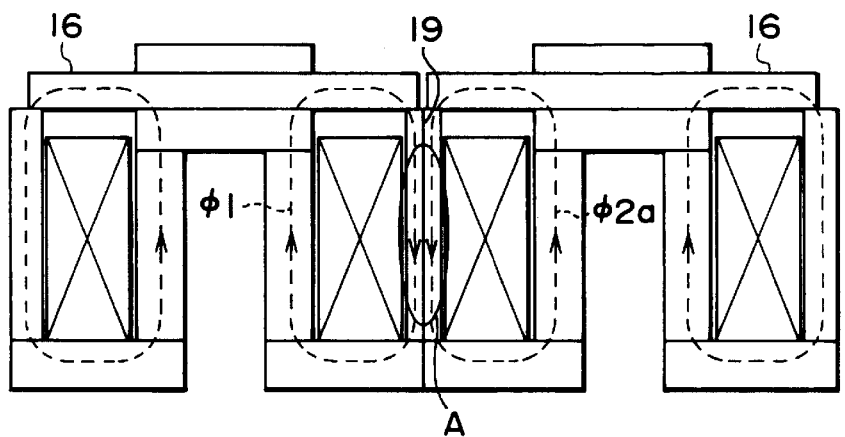
FIG. 4B is a view similar to FIG. 4A, showing a comparison.
Figure 4C:
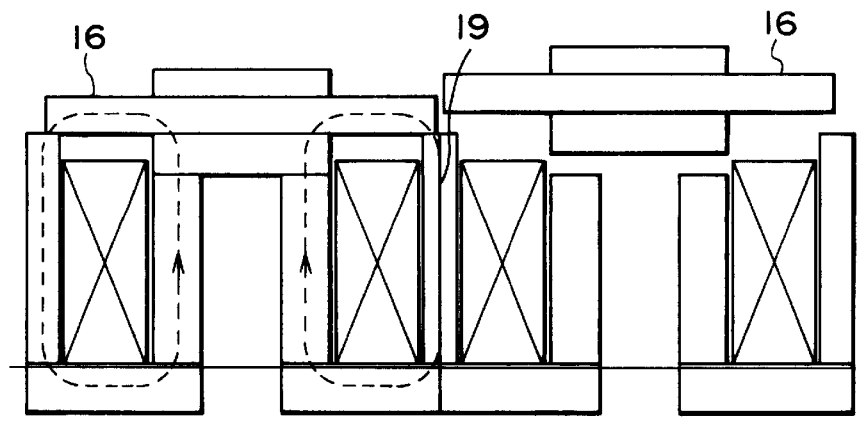
FIG. 4C is a view similar to FIG. 4A, showing another comparison.

FIG. 4B shows magnetic fluxes $\phi 1$ and $\phi 2a$ in the case that the adjacent two solenoids 16 are simultaneously energized so that the magnetic fields generated by the solenoids 16 have the same direction. In this case, the directions of the magnetic fields in the vicinity of the flat contact surface 19 becomes the same to result in an increase in magnetic field H. As a result, a magnetic saturation condition such that the magnetic flux $\phi$ is not increased regardless of an increase in the magnetic field H is generated in the region A, causing a reduction in magnetic attraction force to the armature 14. FIG. 4C shows a magnetic flux in the case that only one of the two adjacent solenoids 16 is energized. In this case, the direction of the magnetic flux may be arbitrarily set.

By adopting the configuration for generating the magnetic fluxes $\phi 1$ and $\phi 2$ as shown in FIG. 4A, the magnetic attraction force can be increased about 20% at the maximum as compared with that in the case shown in FIG. 4B. Further, the magnetic attraction force can be increased about 5% as compared with that in the case shown in FIG. 4C. Accordingly, a required amperage for obtaining a required magnetic attraction force can be reduced about 20% as compared with that in the case shown in FIG. 4B, thereby reducing the power consumption of each solenoid. The above-mentioned 20% or 5% increase in the magnetic attraction force may change according to the shape of each solenoid, that is, the maximum increase may become greater or smaller than the above valve.

Each valve closing solenoid 15 is similar to each valve opening solenoid 16 in configuration and energization method.

It should be noted that the present invention is not limited to the above preferred embodiment, but various modifications may be made without departing from the scope of the present invention. For example, while the driving device of the present invention is applied to the intake valves and the exhaust valves of the internal combustion engine in the above preferred embodiment, the present invention may be applied to a driving device for a plurality of solenoid valves arranged in adjacent relationship and simultaneously driven in some case. For example, also in the case that three or more solenoid valves are arranged in adjacent relationship, a similar effect can be obtained by adopting the configuration of the present invention for a solenoid of each solenoid valve.

Further, the sectional shape of each solenoid is not limited to a circular shape, but any other sectional shapes such as elliptical, square, and oblong shapes may be adopted.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. In a solenoid valve driving device having at least two solenoid valves arranged in adjacent relationship, the improvement wherein the directions of magnetic fluxes generated in solenoids of two adjacent ones of said at least two solenoid valves upon energization thereof are opposite to each other.

2. A solenoid valve driving device according to claim 1, wherein each of said at least two solenoid valves is an intake valve or an exhaust valve of an internal combustion engine, and is provided on the upper side of a combustion chamber of said internal combustion engine.

3. A solenoid valve driving device according to claim 1 or 2, wherein said solenoids of said adjacent solenoid valves are configured so as to partially share magnetic circuits.

4. A solenoid valve driving device according to claim 3, wherein each of said solenoids of said adjacent solenoid valves has an outer yoke as an outermost cylindrical member, a part of said outer yoke being cut out to form a flat contact surface so that said outer yokes of said solenoids are in contact with each other through said flat contact surface.

* * * * *